United States Patent [19]
Schram

[11] Patent Number: 5,048,966
[45] Date of Patent: * Sep. 17, 1991

[54] APPARATUS AND SYSTEM FOR LINEWIDTH MEASUREMENTS

[76] Inventor: Richard R. Schram, 6738 Clybourne, Apt. 252, North Hollywood, Calif. 91606

[*] Notice: The portion of the term of this patent subsequent to May 31, 2000 has been disclaimed.

[21] Appl. No.: 498,575

[22] Filed: May 26, 1983

Related U.S. Application Data

[63] Continuation of Ser. No. 229,655, Jan. 29, 1981, Pat. No. 4,385,837, which is a continuation-in-part of Ser. No. 908,232, May 22, 1978, abandoned.

[51] Int. Cl.[5] .............................................. G01B 11/02
[52] U.S. Cl. .................................... 356/387; 356/384
[58] Field of Search ................. 356/372, 75, 383, 384, 356/387, 375, 378, 394; 200/560, 571

[56] References Cited

U.S. PATENT DOCUMENTS

| | | | |
|---|---|---|---|
| 2,659,823 | 11/1953 | Vossberg | 250/560 |
| 2,731,878 | 1/1956 | Sherwin | 356/445 |
| 2,931,917 | 4/1960 | Beelitz | 250/560 |
| 3,141,057 | 7/1964 | Acton | 250/560 |
| 3,233,506 | 2/1966 | Hart et al. | 356/387 |
| 3,712,741 | 1/1973 | Revert | 356/387 |
| 3,737,856 | 6/1973 | Lehrer et al. | 250/560 |
| 3,740,152 | 6/1973 | Iisuka | 356/375 |
| 3,901,606 | 8/1975 | Watanabe et al. | 356/372 |
| 4,147,052 | 4/1979 | Tsujiuchi et al. | 356/378 |
| 4,385,837 | 5/1983 | Schram | 356/387 |

OTHER PUBLICATIONS

Taylor, F. M., "Using A Laser Micrometer for Precision Control of Wire Diameter and Position on a CV Line", *Proceedings of the* 13th 23rd *International Wire and Cable Symposium*, Atlantic City, N.J., Dec. 3–5, 1974, pp. 326–329.

*Primary Examiner*—Richard A. Rosenberger
*Attorney, Agent, or Firm*—Merchant, Gould, Smith, Edell, Welter & Schmidt

[57] ABSTRACT

A method for measuring linewidths of microelements or lines on wafers or masks in which the line is held in a selected fixed position and a magnified real image of a small area field containing the line is projected on a predetermined focal plane. The magnified image is scanned along a flat path with a moving slit that is substantially parallel to the edges of the line. The slit is sized to vary the light transmitted therethrough in accordance with the optical properties of the line in contrast to the background on the wafer or mask. Transmitted light through the slit is directed onto a photosensitive device moving with the slit which is responsive to the relatively light and dark regions defined by the line and the adjacent area. The distance of movement of the slit and the output signal from the photosensitive device are both monitored and both edges of the image of the line are located by identifying characteristic changes in the output signal. The spacings between the line edges as determined by the amount of slit movement and the characteristic output signal changes are used to generate a digital output that is proportional to the width of the line.

8 Claims, 5 Drawing Sheets

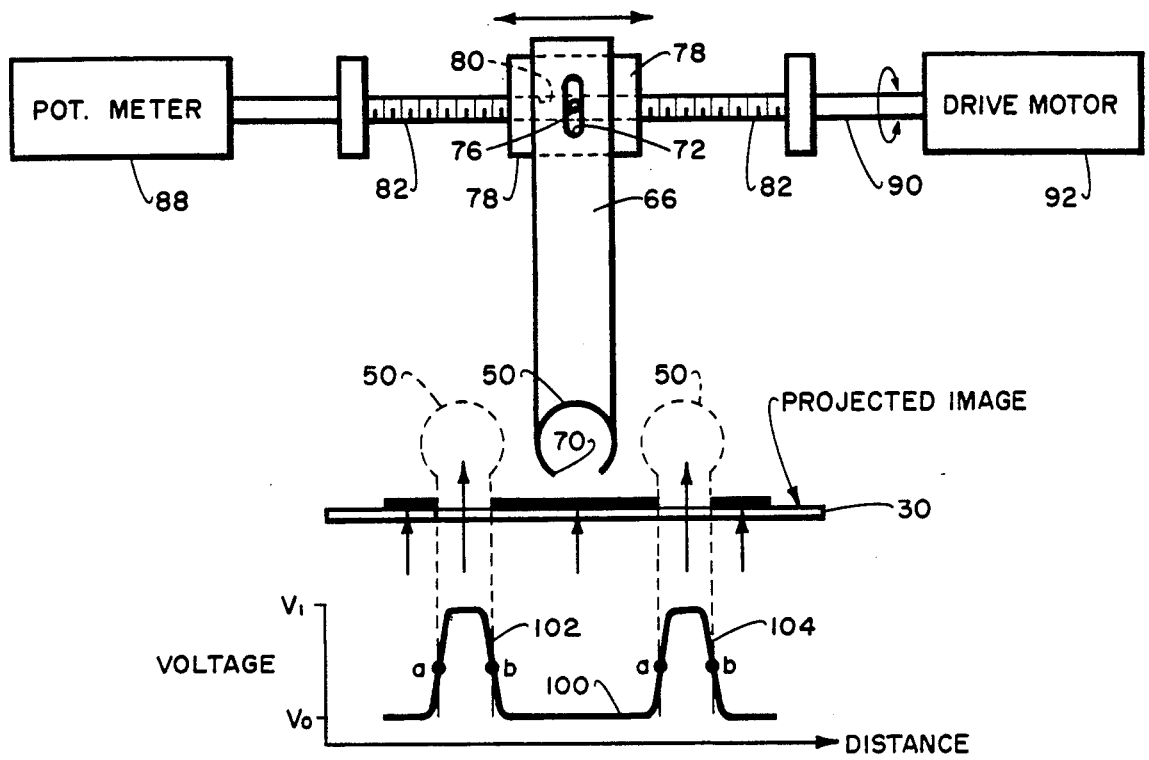
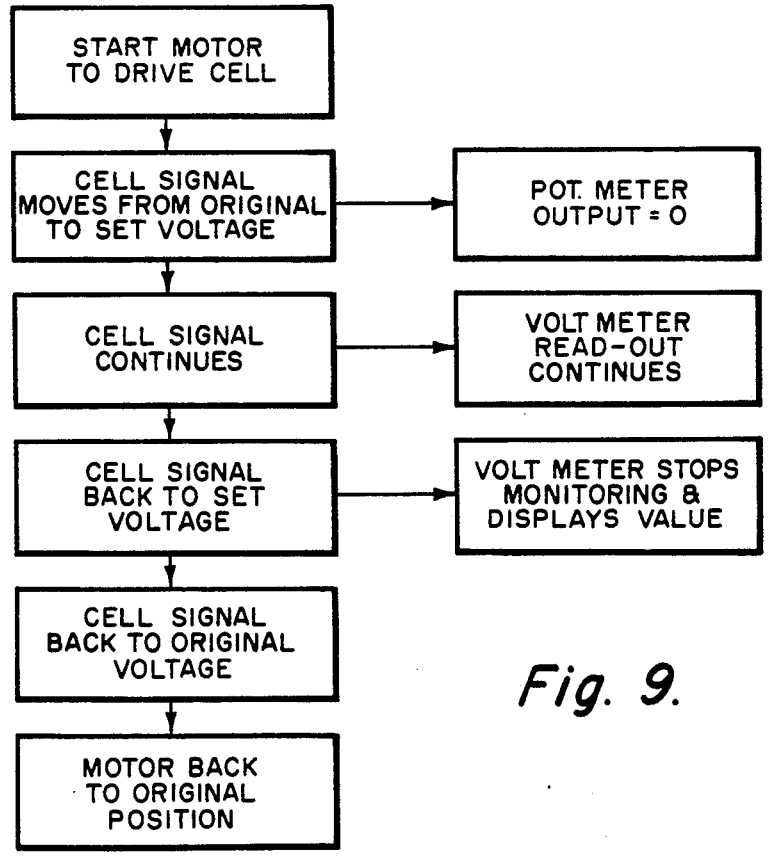
Fig. 7.
Fig. 9.

5,048,966

APPARATUS AND SYSTEM FOR LINEWIDTH MEASUREMENTS

CROSS-REFERENCE TO RELATED APPLICATION

This application is a continuation of application Ser. No. 229,655, filed Jan. 29, 1981, now U.S. Pat. No. 4,385,837, issued May 31, 1983, by the same title and by the same inventor; which in turn is a Continuation in Part of Patent application Ser. No. 908,232, filed May 22, 1978, now abandoned, by the same title and by the same inventor.

BACKGROUND OF THE INVENTION

The field of this invention relates to an apparatus for measuring linewidths on masks and wafers employed in the manufacture of large-scale-integrated (LSI) devices and more particularly, to an apparatus for accurately ascertaining the aforesaid linewidth measurements.

As is well known within the prior art, there are universally utilized various small-feature-size masks to fabricate microelement devices. A typical such mask comprises a planar glass member having an opaque coating such as chrome deposited thereon. In conventional ways, the opaque coating is selectively patterned to form multiple regions of chip areas, each having opaque and transparent portions. Illustratively, the regions are patterned to be identical replicas of each other. In each region, clear or transparent features may be formed in an opaque background, or vice versa.

Typically, the pattern or subregion, is visible to an operator using a microscope. By way of example, a typical subregion could be one millimeter in diameter and have an area of 0.8 square millimeter. Again, as herein above mentioned, the mask subregion comprises clear portions and opaque portions (or lines). It is well recognized that highly accurate control is required for the linewidths formed on masks and wafers as these linewidths are extremely critical to the overall process of manufacturing LSI devices. Thus, for example, before using a set of masks to form features on an associated wafer, it is important that each of the masks be checked to determine whether or not specified linewidths thereon have been made within specified tolerances. A wafer is an opaque base upon which lines are formed.

In a prior art linewidth measurement device, a procedure is followed which includes making a calibrated and normalized measurement of the average light transmission (or reflection) in a specified subregion, the latter including a feature whose linewidth is to be determined. In turn, this measurement is automatically converted to a linewidth reading by analog computing circuitry.

One known apparatus for measuring linewidths within selected subregions of a microelement, wherein each subregion includes features exhibiting two contrasting optical properties, comprises two reference subregions each uniformally exhibiting a different one of the two contrasting optical properties. Included within this apparatus is an illuminating source for directing light at each one of the reference subregions and at a selected subregion to be measured. Light responsive means is provided to obtain light directly from the source and from light which is impinged upon a reference subregion for generating normalized reference and subregion signals. A processor is arranged for the normalized signals to generate a signal representative of one of the optical properties of the selected subregion. Finally, a process is also arranged for the last mentioned representative signal in accordance with a predetermined relationship to generate a signal directly representative of a specified linewidth in a selected subregion. Although this type of apparatus has its own unique set of characteristics, it is complex in nature and calls for optical and electrical elements which are expensive to maintain and to operate.

Previous to this invention, all known linewidth measuring devices are moved lineally by moving the specimen. Moving of the specimen inherently requires tremendous accuracy and sensitivity in order to make accurate measurements. Accurate measurements are extremely necessary in order to successfully transfer a pattern from a mask. The measuring system used should be reliable in order to confidently proceed from one step to the next succeeding step in the forming of a microelement. The ultimate yield of usable chips per wafer is a direct function of each step in the process which includes the measuring of dimensions.

Normally a microelement is composed of a plurality of superimposed, thin wafer layers. Because each succeeding layer is superimposed on another layer, line dimensions become extremely important in order to achieve the desired electrical conducting path without the producing of any electrical shorts. Accordingly, there is a definite need for a simplified, low cost and accurate linewidth measurement apparatus.

SUMMARY OF THE INVENTION

The structure of this invention mounts a mask or wafer upon a planar supporting surface which is capable of being moved within the x and y direction. A subregion of the mask or wafer is observed by a microscope and projected through an eyepiece along the z axis. The enlarged projected image is located adjacent a photodevice. The photodevice includes an access opening in the form of a slit of predetermined dimension. The photodevice and its associated slit are mounted for pivotal movement about the exit pupil of the eyepiece of the microscope through which the image is projected. The photodevice and its associated .slit are moved across the circular arc of the projected image. The movement of the photodevice and its associated slit is accomplished through use of a motor which operates through a lead screw which in turn is connected to the photodevice. An optical encoder is electrically connected to the photodevice which is to register the traverse of the photodevice and its associated slit across the projected image. The output of the photodevice as it is moved across light and dark lines of the projected image is then compared to a reference value. The resulting compared output is displayed, which is representative of the dimension of the formed lines within the projected image.

A primary objective of the present invention is to provide a simple, reliable linewidth measurement system which eliminates human judgment with respect to choosing or determining the leading and trailing edges of a linewidth on a microelement so as to facilitate measurement of narrow linewidths with greater accuracy.

A further objective of this invention is to construct an apparatus for relating a mask or wafer linewidth to the optical properties of a leading and trailing edge of a line, with the optical properties being transformed into electrical signals, processed in a predetermined manner, without human interference, to produce a value displayed digitally which is proportional to the linewidth.

A further objective of this invention is to provide an apparatus in which a photodevice and associated slit are moved laterally through a real image in a manner such that the photodevice and slit are always pointed at the exit pupil of the eyepiece of the optical observing apparatus which is generally a microscope, which assures that the light rays forming the image of an edge are identical for narrow and wide lines, thereby assuring linearity.

A still further objective of this invention is that in the accomplishment of the measurement, a trigger circuit is automatically actuated, which in turn controls a digital display so that the dimension from the leading to trailing edge of a linewidth is displayed without any operator judgment.

BRIEF DESCRIPTION OF THE DRAWINGS

FIG. 7 is an illustrative front View of the photodevice and its associated slit within the linewidth measuring apparatus of this invention showing the photodevice in different positions with respect to the projected image of a mask; a graph of the voltage output of the photodevice in these different positions is also illustrated;

FIG. 9 illustrates a flow diagram which summarizes the linewidth measurement technique according to the invention.

DETAILED DESCRIPTION OF THE SHOWN EMBODIMENT

Figure 1:
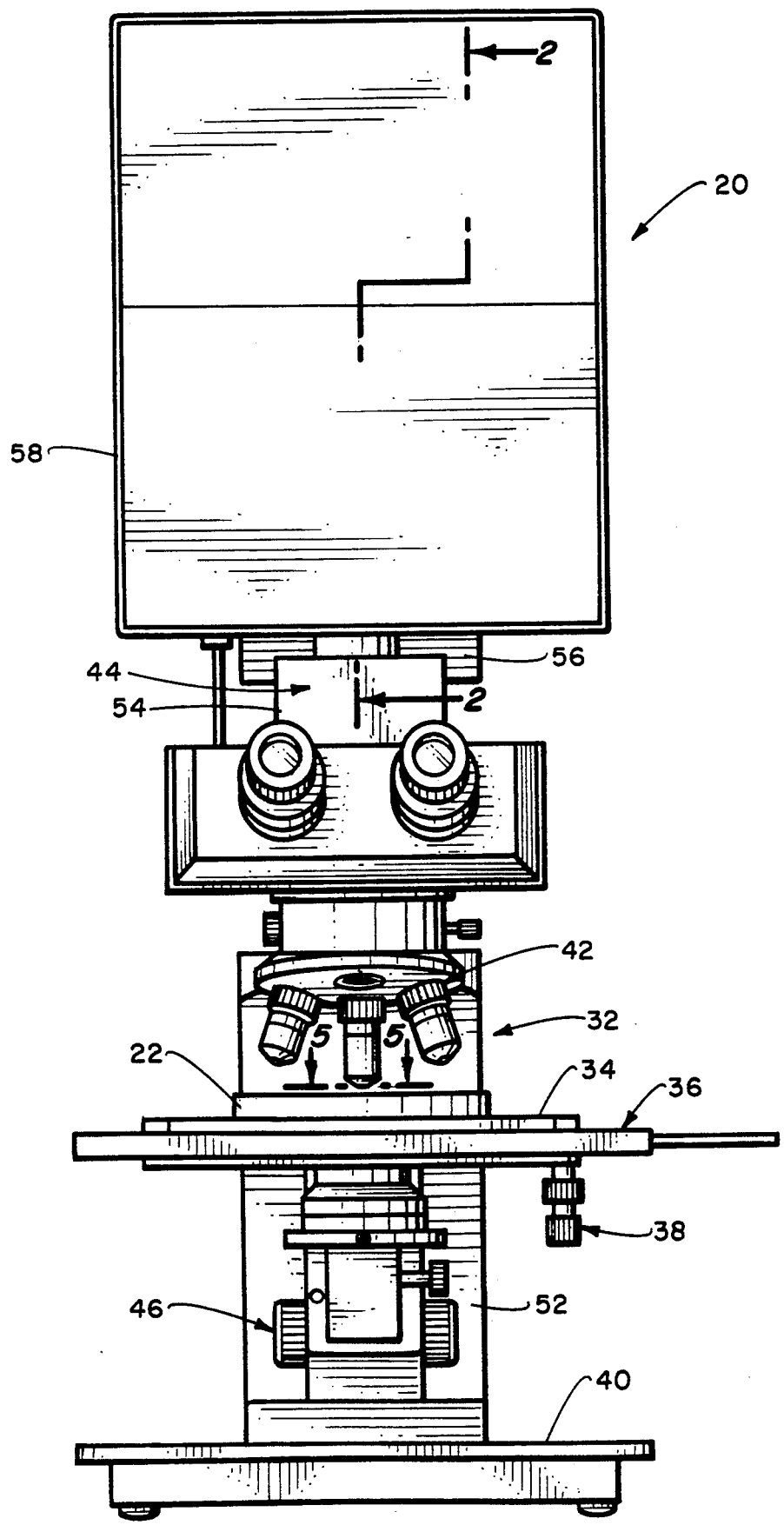
FIG. 1 is a front elevational view of the linewidth measuring apparatus of this invention.
Figure 2:
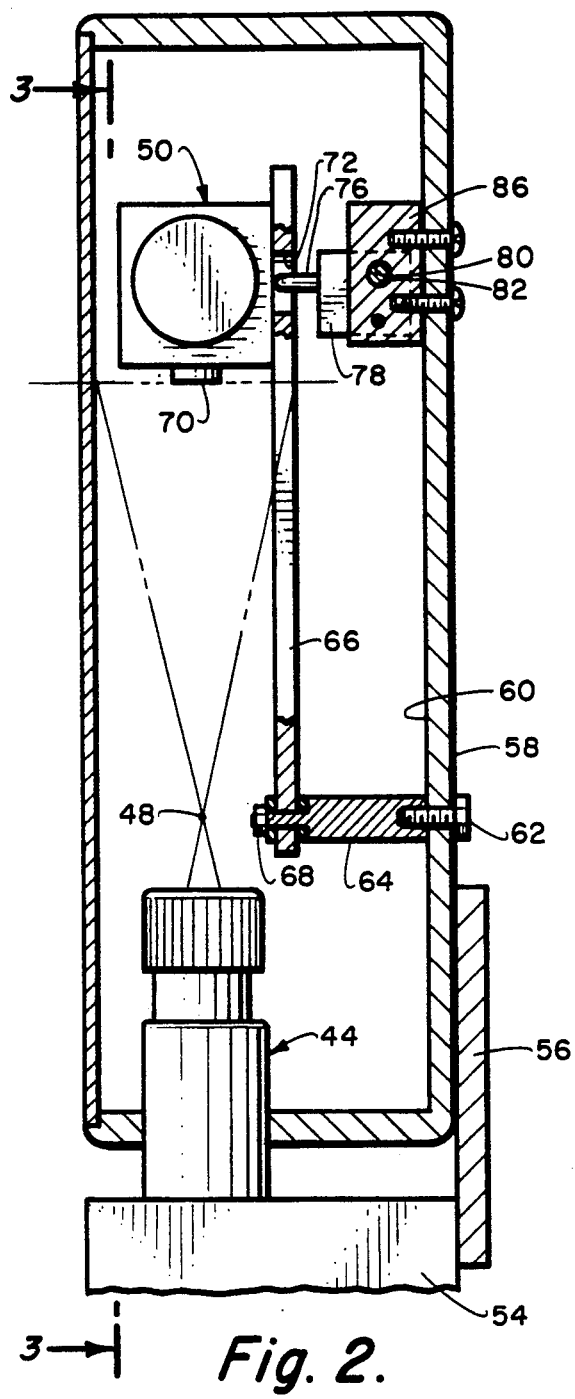
FIG. 2 is a side cross-sectional view through a portion of the linewidth measuring apparatus of this invention taken along line 2—2 of FIG. 1.
Figure 5:
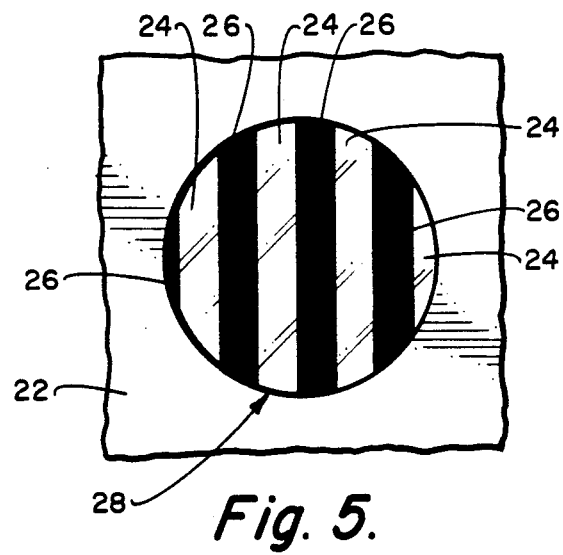
FIG. 5 is a top plan view of a subregion of a mask or wafer of a microelement within which linewidths are to be measured.

Referring particularly to the drawings, there is shown within FIG. 1, the apparatus 20 of this invention which is intended to be employed to measure linewidths on masks (or wafers) 22. The mask 22 is deemed to be conventional and is to be constructed of a series of clear or bright lines 24 interposed with a series of opaque or dark lines 26. The lines 24 and 26 are depicted generally within the circular shaped magnified section 28 shown within FIG. 5. This magnified section 28 is to be represented at projected image 30. This image 30 is produced through the use of standard microscope 32. The projected portion of the mask 22 will be quite small, such as about one millimeter in diameter.

The mask 22 is to fixedly mounted on a plate 34. The plate 34 is part of an x-y micropositioner 36. The micropositioner 36 is to be manually adjusted through knob assembly 38 to move the mask 22 along the x-y axes. The use of such a micropositioner 36 is deemed to be conventional in conjunction with a microscope 32.

Microscope 32 is mounted on a base 40. The microscope 32 includes an objective lens assembly 42 through which the projected image is to be passed into an eyepiece assembly 44. Again, the eyepiece assembly 44 and the objective lens assembly 42 are deemed to be conventional. Vertical, or z-axis adjustment of the objective lens assembly 42 and the eyepiece with respect to the mask 22 is accomplished through the use of adjusting knob assembly 46.

Through the use of the x-y positioner 36, any desired subregion 28 can be observed of the mask 22. Light is to be transmitted through the subregion 28, through the objective lens asembly 42, through the eyepiece 44 to produce the projected image 30. It is to be noted that the projected image from the eyepiece 44 has an exit pupil 48.

Fixedly mounted and upstanding from the base 40 is a mounting housing 52. The x-y positioner 36 is mounted on the mounting housing 52. Also fixedly mounted on the mounting housing 52 is an eyepiece housing 54. Fixedly secured by a mounting plate 56 to the eyepiece housing 54 is an upper housing 58. The upper housing 58 includes an internal chamber 60.

Fixedly mounted by means of a fastener 62 to the back side of the upper housing 58 is a rod 64. The free end of the rod 64 has pivotally mounted thereon one end of a pivot arm 66. The arm 66 is attached to the rod 64 by means of a screw threaded nut assembly 68.

Fixedly mounted adjacent the outer end of the arm 66 is a photodevice 50. The photodevice 50 may comprise a photocell, a photodiode, a photomultipler tube or any other similar mechanism which changes light intensity into an electrical current or voltage. In the illustrated drawings, the photodevice 50 is in the form of a photocell having an access opening comprising a slit 70 into the interior of the photocell. The slit 70 has precise known width. The photodevice 50 is mounted on the front side of the arm 66.

Formed within the back surface of the arm 66 is a slot 72. The longitudinal center axis of the slot 72 coincides with the longitudinal center axis 74 of the arm 66. Located within the slot 72 is a pin 76. It is to be noted that the width of the slot 72 is just slightly larger than the diameter of the pin 76. This is so that, for all practical purposes, lateral movement of the pin 76 within the slot 72 is eliminated.

The pin 76 is fixedly mounted onto a nut 78. The nut 78 includes a transverse threaded hole 80. Threadbly connected within the hole 80 is a lead screw 82. The lead screw 82 is rotatably mounted within a pair of spaced apart mounting brackets 84 and 86. Each of the brackets 84 and 86 are fixedly secured to the housing 58 by conventional fastening means. The outer end of the lead screw 82 is rotatably mounted within a potentiometer 88. The inner end of the lead screw is fixedly secured to the drive shaft 90 of a drive motor 92.

Figure 6:
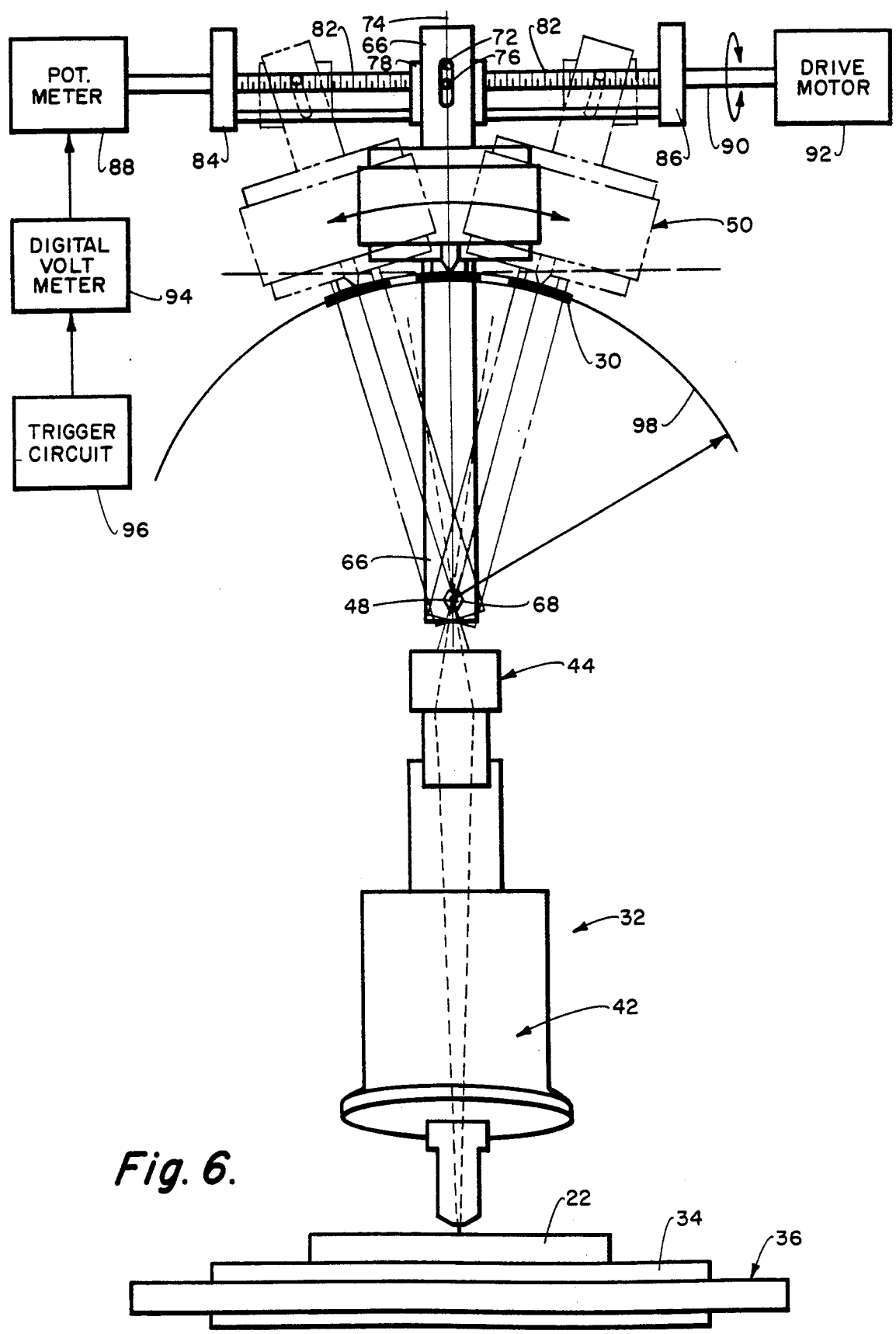
FIG. 6 is a diagramatic view of the linewidth measuring structure of this invention generally illustrating the movement of the photodevice across the projected image wherein the photodevice has been displaced from the lead screw for reasons of illustrative clarity.

Operation of the drive motor 92 causes rotation of the lead screw 82. This results in lineal movement of the nut 78. As a result, the pin 76 causes the arm 66 to be pivoted about the center which coincides with the exit pupil 48. During this pivoting of the arm 66, the pin 76 longitudinally moves within the slot 72. The pivoting of the arm 66 is graphically depicted by the phantom line positions shown within FIG. 6 of the drawings.

The drive motor 92 is to be capable of being reversibly driven. Coupled directly to the potentiometer 88 is a digital voltmeter 94. A trigger circuit 96 is operatively connected to the voltmeter 94. The operation of the potentiometer 88, the voltmeter 94 and the trigger circuit 96 will now be explained in detail.

Operation of the motor 92 causes the lead screw to rotate and the nut 78 to move lineally Inasmuch as the photocell 50 and the slit 70 are mounted on the arm 66, the photocell 50 and the slit 70 are forced to move in the same direction as the nut 78. Because of the pivot connection about the point 48, the cell 50 and the slit 70 move along the circumference of a circle which is defined as arc 98. As previously stated, the pivot axis of the arm 66 coincides with the exit pupil of the microscope eyepiece 44.

The mask 22 and the subregion 28 that is to be tested is mounted in close proximity to the microscope objective lens assembly 42. Initially, the subregion 28 is located at the desired location through use of the x-y positioners. The drive motor 92 is then activated to move the photocell 50 across the projected image 30 across one linewidth 24.

It is desirable to have the photocell to be orientated to directly receive the rays of light. To accomplish this, the plane of this slit 70 is maintained perpendicular to the direction of the image forming rays. This is achieved by continuously "positioning" the photocell 50 and slit 70 toward the exit pupil.

It is to be understood that due to manufacturing variations that the width of one line 24 will not be exactly the same as another line 24. However, by using the linewidth measuring structure of this invention, it can be ascertained whether established manufacturing tolerances are still being met and, if not, appropriate corrective action is to be taken in the manufacturing of the mask 22.

The position of the lead screw 82 as it is moved by the motor 92 can be determined at any point in time by reading of the voltage across the potentiometer 88. As the slit 70 moves across the projected image 30, a graph, similar to what is shown in FIG. 7, results, which represents the voltage output of the photocell 50. The voltage output of the photocell 50 is monitored by the digital voltmeter 94. Referring particularly to the graph shown within FIG. 7, there is shown line 100 which includes a pair of spaced-apart projecting sections 102 and 104 Both sections 102 and 104 have points denoted as "a" and "b". When the voltage output of the photocell 50 reaches, for example, point "a" of section 102, the digital voltmeter 94 will then be automatically set at zero and as the slit 70 continues to move, the voltage is continually read-out until the reading drops to point "b". This is also true for projecting section 104. The trigger circuit 96 controls the display from the potentiometer 88 and sets the given value of the voltmeter 94. The voltage reading is therefore proportional to the actual width of the bright line 24 that is being observed across the projected image 30. Hence, the electrical resistance of the potentiometer 88 is directly proportional to the lineal position of slit 70 with respect to the projected image 30. The electrical resistance of the photocell 50 can be converted to a voltage value and can be displayed in arbitrary units on the digital voltmeter 94. This voltmeter reading is to be displayed by a digital display assembly.

Figure 8:
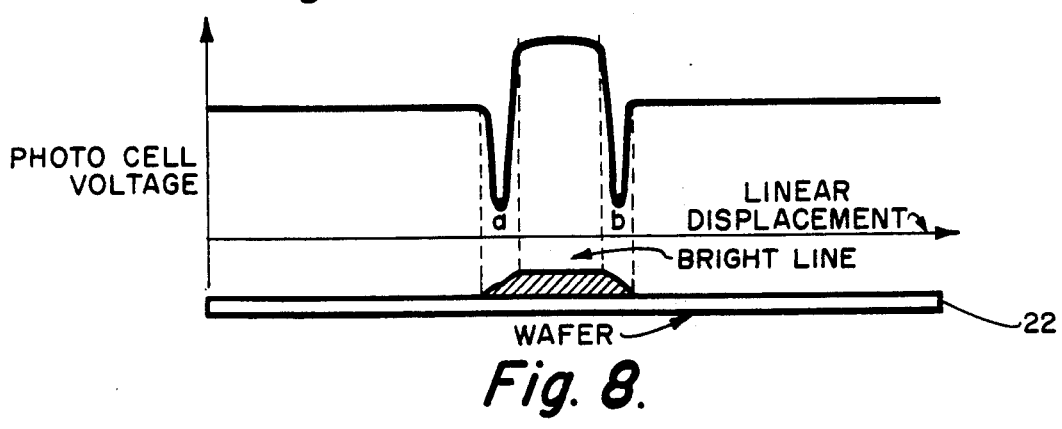
FIG. 8 shows a graph illustrating the photodevice associated with the optical signal from a wafer.
Figure 3:
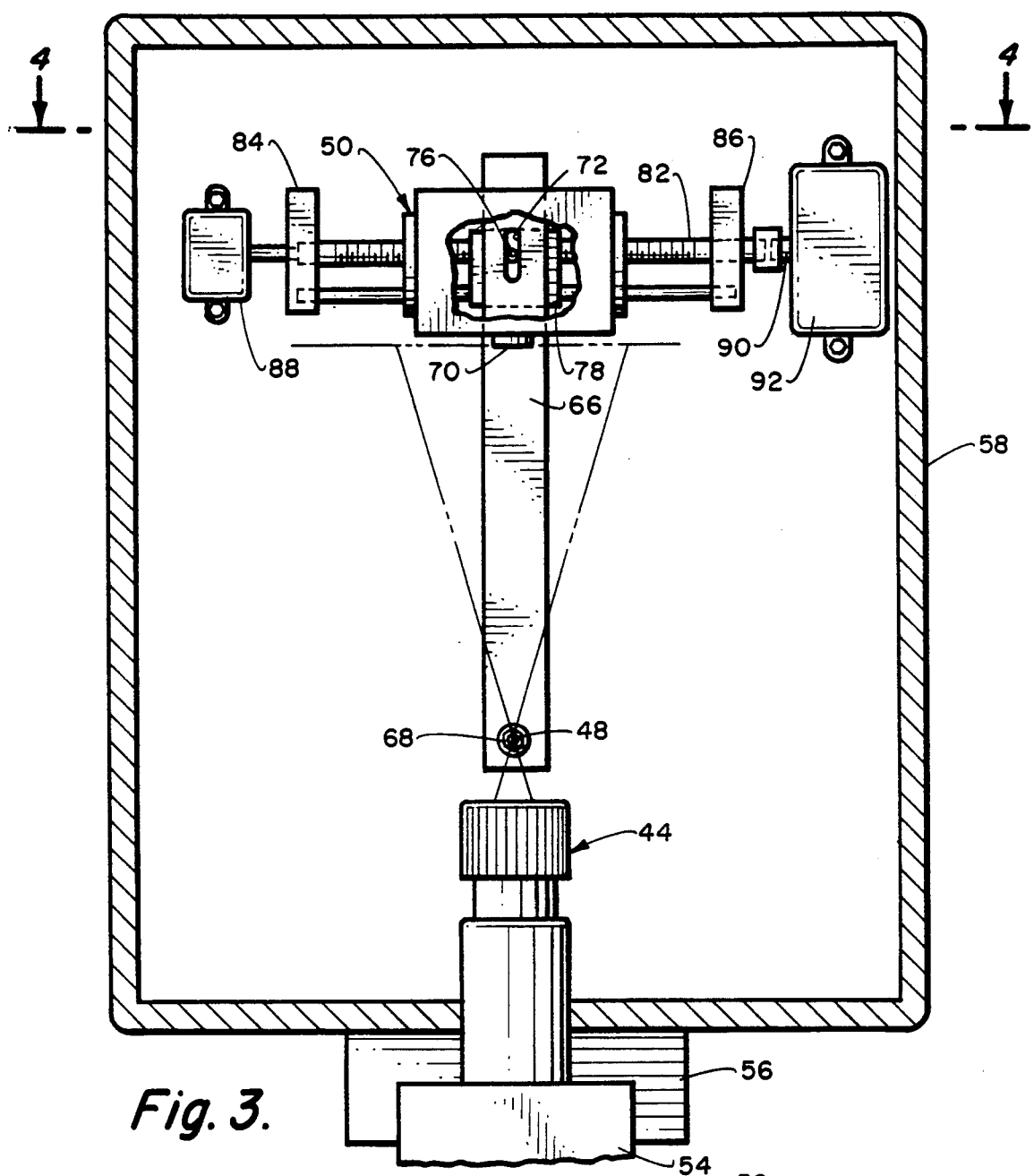
FIG. 3 is a front, partly in cross-sectional view of a portion of the structure of the linewidth measuring apparatus of this invention taken along line 3—3 of FIG. 2.
Figure 4:
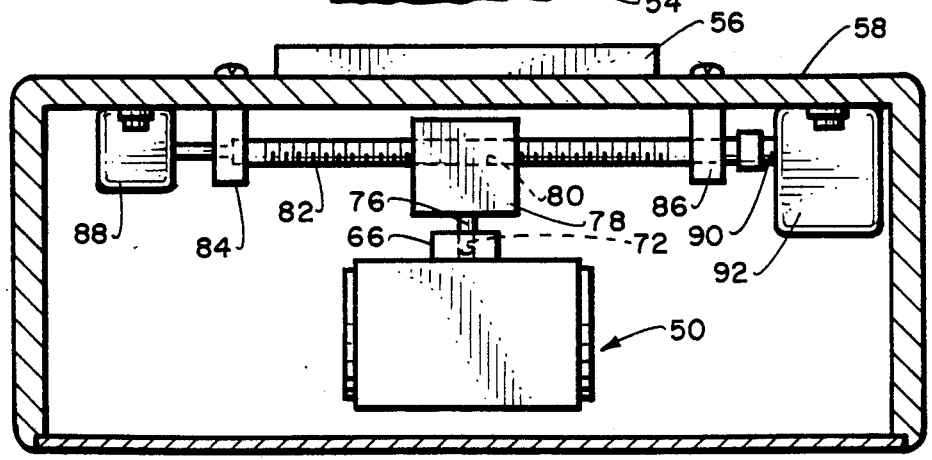
FIG. 4 is a top, partly in cross-sectional view through a portion of the linewidth measuring apparatus of this invention taken along line 4—4 of FIG. 3.

FIG. 8 is related to the optical signals from a wafer to show the difference in the read-out of the potentiometer 88, as displayed by the digital voltmeter 94, between the slit 70, of the photocell 50 at positions "a" and "b". It can be seen that a microelement on a wafer produces a U-shaped first dip in the sensed output magnitude of the photocell as the initial or beginning edge of the microelement is encountered in the region "a" and a second U-shaped dip as the trailing edge of the microelement is encountered in the region "b" while scanning across the microelement. Also, the amplitude of the signal from the microelement is higher than the level from the adjacent substrate areas. The wafer is measured by reflected light where the mask is measured by transmitted light.

The aforedescribed linewidth measurement procedure is summarized by the flow diagram shown within FIG. 9. Initially, the drive motor 92 is activated to move arm 66 and thereby slit 70 across the projected image 30. When the signal from the photocell 50 reaches a set value, such as one half or one third of $V_1 - V_0$, the voltage of potentiometer 88 is set to zero by trigger circuit 96. When the signal from potentiometer 88 continues at a higher value than the set value, the read-out at the digital voltmeter 94 increases. When the signal of photocell 50 decreases to just below the set value, the digital read-out stops monitoring potentiometer 88 and then displays an arbitrary value. The displayed value is proportional to the distance that the slit 70 travels between reading the first set voltage value and the second set voltage value. This displayed value is then compared to a previously ascertained calibrated known value for known linewidth dimension to therefore calculate the linewidth that is desired to be measured. Once this calibration to known linewidths has been made, the instrument can be used to then measure directly unknown linewidths.

Subsequentially, when the photocell signal (volts), drops to the original value $V_0$ the motor 92 reverses the lead screw 82 to return the photocell 50 to its original starting position and is now ready for the next cycle. It is to be kept in mind that only a single linewidth is measured at a time. Within each subregion, there are several lines to be measured. The mask or wafer is then repositioned by the x-y position so as to perform the measuring of the next linewidth.

The measuring apparatus of this invention is most useful in making larger linewidth measurements (5 to 20 micrometers). If it was only required to measure linewidths under 5 micrometers, the photodevice could be moved lineally and no correction be required due to distortion, i.e., not required to be moved on the circumference of a circle.

What is claimed is:

1. A method for measuring linewidths of microelements on wafers and lines on masks comprising the steps of:

holding said microelement or line in a selected fixed position;

projecting a magnified, real image of a field having an area less than or equal to approximately 0.8 square millimeter containing said microelement or line to be measured to a predetermined focal plane;

scanning across the magnified real image with a moving slit positioned to be substantially parallel to the edges of the microelement or line, the slit being of a predetermined size to vary the light transmitted therethrough in accordance with the optical properties of the microelement or line in contrast to the background on the wafer or mask, and the scanning directing the transmitted light onto a photosensitive device responsive through the slit to the relatively light and dark regions defined by said microelement or line and the adjacent area, the slit and photosensitive device being scanned along a flat path;

monitoring the distance of movement of the slit and an output signal from the photosensitive device;

locating both desired edges of the image of said microelement or line by a predetermined characteristic of the output signal from said photosensitive device; and utilizing the spacings between the desired edges as determined by the amount of movement of said slit and the predetermined characteristic in output signal from said photosensitive device to generate a digital output representation proportional to the width of said microelement or line.

2. The method as set forth in claim 1 above, wherein the projected image is transmitted through a mask.

3. The method as set forth in claim 1 above, wherein the projected image is reflected from a wafer.

4. A method of measuring linewidths of microelements on wafers and lines on masks, the linewidths being less than 5 micrometers, comprising the steps of:

holding said microelement or line in a selected fixed position;

projecting to a predetermined focal plane a magnified, real image of a subregion of the wafer or mask, the subregion being approximately 1 mm in diameter or less;

scanning the magnified real image transversely to the length of the microelement or line with a slit parallel to the length of the microelements or lines and of precise known width, and a photosensitive device, to view a small line segment of the magnified subregion containing the relatively light and dark regions defined by said microelement or line and the adjacent area, the slit and photosensitive device being scanned along a substantially flat path and the slit being sufficiently small to provide transitions in the electrical signal when crossing the beginning or ending of a microelement or line;

monitoring the movement of the slit and photosensitive device;

monitoring the output of the photosensitive device;

locating both desired edges of said microelement or line by determining when the response of said photosensitive device crosses a given level; and utilizing the location of the desired edges and the amount of movement of said slit and photosensitive device between such edges to generate an output representation proportional to the width of said microelement or line.

5. The method of measuring linewidths of individual lines on masks and microelements on wafers in patterns for semiconductor, in which the linewidths are less than 5 microns and an indication of linewidth is given without requiring operator judgment as to the edges of the line, comprising the steps of:

magnifying a selected region or less than 1.0 mm² of the pattern to present a magnified optical image of a limited number of lines;

positioning the pattern in two orthogonal directions such that a line to be measured in the optical image is aligned with a selected axis and the magnified region has the line to be measured adjacent the initial position of a scanning slit, the slit having a length dimension parallel to the selected axis and a width dimension such that light energy from substantially less than a linewidth passes through the slit;

scanning the slit across the magnified optical image of the line on the mask or wafer transversely to the length thereof;

detecting light energy passing through the slit to generate an electrical signal, the light energy from the optical image being free of light dispersing interference;

detecting transitions in the electrical signal due to changes in the light energy transmitted as the slit crosses the start and the end of the linewidth;

measuring the distance traveled by the slit between the start and end of the linewidth; and generating a display value indicative of the linewidth from the measured distance such that the display is provided without reliance on operator judgment or activity subsequent to initiation of scanning.

6. The invention as set forth in claim 5 above, further including the step of calibrating the distance traveled by the slit between the start and end of the linewidth with respect to a known value of linewidth and generating a digital display value representative of actual linewidth.

7. The method of measuring linewidths on masks or wafers in the manufacture of large-scale-integrated devices which have linewidths under 5 micrometers to eliminate human judgment with respect to determining the leading and trailing edges, comprising the steps of:

observing a subregion of the mask or wafer under magnification while projecting an enlarged projected real image along a Z axis, the projected portion representing about 1 mm in diameter of the mask or wafer;

positioning the subregion of the mask or wafer in the X and Y directions to a desired location adjacent to a linewidth to be measured;

transmitting the enlarged projected image onto a photocell directly receiving the rays of light through a slit of precise known width, the length of the slit being parallel to the length of the line;

scanning the slit and photocell laterally across one linewidth in the enlarged projected real image while holding the mask or wafer stationary;

transforming the varying optical properties of the leading and trailing edge of the line into electrical signals from the photocell; and processing the electrical signals without human interference to produce a digital value proportional to linewidth.

8. The method as set forth in claim 7 above, wherein the step of processing the electrical signals comprises automatically sensing transitions in the signals relative to a predetermined value, deriving an electrical signal representative of the distance between transitions at the leading and trailing edge of the line, and producing a digital value responsive thereto.

* * * * *